(12) United States Patent
Falkenstein et al.

(10) Patent No.: US 8,919,467 B2
(45) Date of Patent: Dec. 30, 2014

(54) METHOD FOR OPERATING A HYBRID VEHICLE AND CONTROL UNIT FOR IMPLEMENTING THE METHOD

(75) Inventors: Jens-Werner Falkenstein, Aalen (DE); Michael Glora, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 1893 days.

(21) Appl. No.: 12/224,022

(22) PCT Filed: Jan. 30, 2007

(86) PCT No.: PCT/EP2007/050862
§ 371 (c)(1),
(2), (4) Date: Jul. 20, 2010

(87) PCT Pub. No.: WO2007/099001
PCT Pub. Date: Sep. 7, 2007

(65) Prior Publication Data
US 2010/0280736 A1    Nov. 4, 2010

(30) Foreign Application Priority Data

Feb. 24, 2006 (DE) .......................... 10 2006 008 641

(51) Int. Cl.
*B60W 10/06* (2006.01)
*B60W 10/08* (2006.01)
*B60W 20/00* (2006.01)
*B60K 6/48* (2007.10)

(52) U.S. Cl.
CPC ............. *B60W 20/00* (2013.01); *B60W 20/108* (2013.01); *B60W 20/10* (2013.01); *B60K 6/48* (2013.01); *B60L 2240/486* (2013.01); *B60W 10/06* (2013.01); *B60W 10/08* (2013.01); *B60W 2710/105* (2013.01); *Y02T 10/6221* (2013.01); *Y02T 10/6286* (2013.01)
USPC .............. 180/65.26; 180/65.265; 180/65.28; 180/65.285

(58) Field of Classification Search
USPC ................. 701/65.26, 65.265, 65.28, 65.285; 180/65.26, 65.265, 65.28, 65.285
See application file for complete search history.

(56) References Cited

U.S. PATENT DOCUMENTS

| | | | | |
|---|---|---|---|---|
| 5,176,213 A * | 1/1993 | Kawai et al. | ................... | 180/243 |
| 6,109,237 A * | 8/2000 | Pels et al. | ................. | 123/339.19 |
| 7,115,065 B2 * | 10/2006 | Tabata et al. | ....................... | 477/3 |
| 7,431,111 B2 * | 10/2008 | Nada | .......................... | 180/65.28 |
| 8,090,518 B2 * | 1/2012 | Lang | ............................ | 701/102 |
| 2001/0002090 A1 | 5/2001 | Hlich et al. | | |
| 2004/0259682 A1 * | 12/2004 | Tabata et al. | .................. | 477/102 |

FOREIGN PATENT DOCUMENTS

| | | | |
|---|---|---|---|
| DE | 19704153 | * | 8/1998 |
| EP | 1743794 | * | 1/2007 |
| WO | WO 99/62735 | * | 12/1999 |

* cited by examiner

*Primary Examiner* — Erick Solis
(74) *Attorney, Agent, or Firm* — Kenyon & Kenyon LLP

(57) ABSTRACT

A method and a control unit for operating a hybrid vehicle, in which at least two units, of which at least one is an internal combustion engine, supply torque for a hybrid vehicle drive. It is provided that an overall required reserve torque be ascertained, and boundary values of currently available reserve torque of each individual unit be determined.

2 Claims, 1 Drawing Sheet

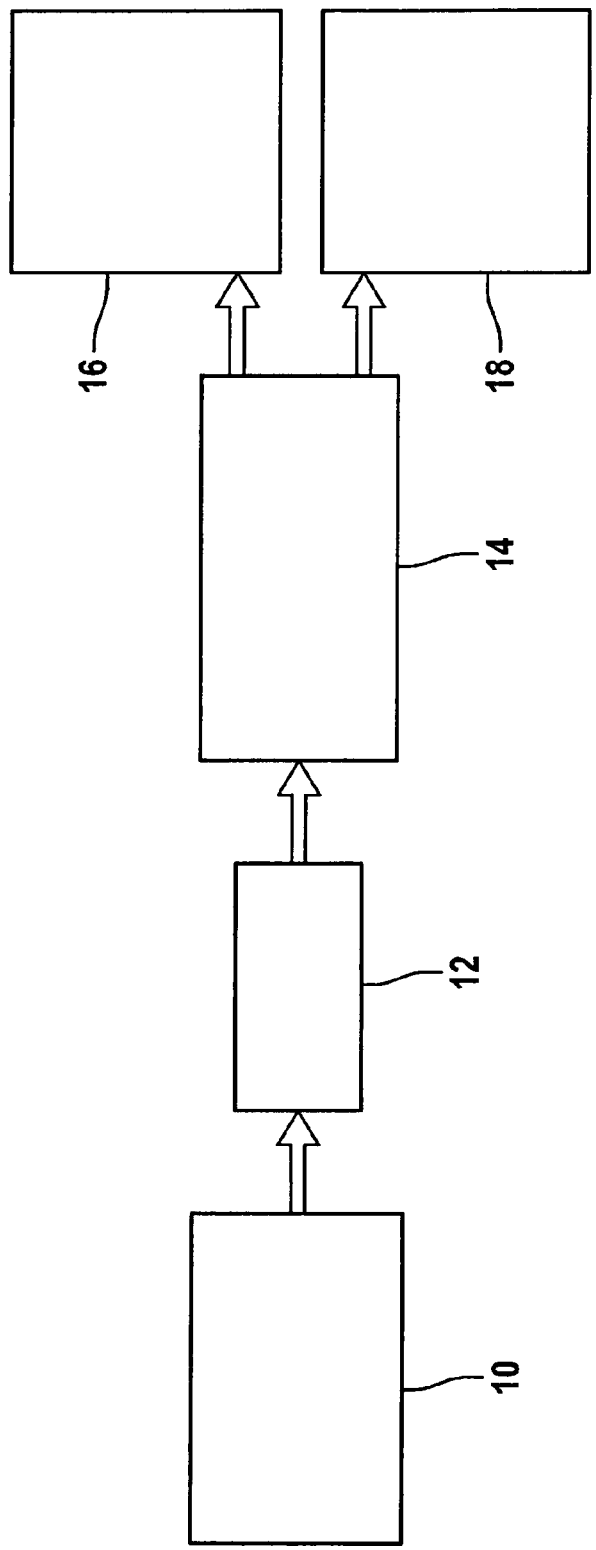

METHOD FOR OPERATING A HYBRID VEHICLE AND CONTROL UNIT FOR IMPLEMENTING THE METHOD

BACKGROUND INFORMATION

There is an algorithm for rotational speed regulation in the control unit of a motor vehicle. The essential task of this controller is setting a constant idling speed that is not to be undershot. In conventional vehicles having an internal combustion engine, the engine is driven accordingly. For hybrid vehicles which, in addition to the internal combustion engine, have further units, in particular at least one electric motor, the further unit(s) may be included when it comes to the setting of the desired rotational speed. Such a method has, for instance, already been proposed in German Patent Application No. DE 10 2004 06 012.

SUMMARY OF THE INVENTION

A method is provided for operating a hybrid vehicle, in which at least two units, of which at least one is an internal combustion engine, provide torque for a hybrid vehicle drive, and in which a required overall reserve torque is ascertained, and the boundary values of currently available reserve torques of each individual unit are determined. A speed controller is used which may preferably be developed as a conventional PID controller. Whereas, in a conventional vehicle, the sum of proportional component, integral component and differential component of the control signal is set by the internal combustion engine, the different controller proportions in a hybrid vehicle may be distributed to the internal combustion engine and, for instance, one electric motor or several electric motors. One possible subdivision provides for the implementation of the integral component at the internal combustion engine, and one subdivision of the overall controller gain (overall proportional component and/or perhaps overall differential component), for instance, per proportions at the internal combustion engine and at the electric motor. In the subdivision, in this context, possible restrictions in the actuating variables of the units are preferably taken into account. Thus, problems in providing the torque may advantageously be avoided. For example, it is true that an Otto engine is able to implement rapid, torque-reducing actuating commands by appropriate ignition angle interventions, but, on the other hand, rapid torque-increasing actuating commands can only be implemented if, at the right time, in advance, an appropriate torque aiming-off allowance was carried out by increasing the air charge together with a simultaneous ignition timing adjustment. It is analogous for electric motors if, for instance, a battery, as electrical store, is briefly not able to provide or absorb sufficient energy, or corresponding maximum or minimum torques have already reached a maximum.

A required overall reserve torque is preferably ascertained, by a global rotational speed coordinator, which can be recalled within the shortest time period, and consequently is able to be set rapidly, as necessary, in sum by the proportional component or the derivative component of the internal combustion engine and the proportional component and the derivative component of the electric motor (or motors).

In parallel to this, boundary values of the currently possible reserve torques can be calculated for all participating units. The maximum torque and minimum torque of the electric motor as well as limits, such as set by electrical storage, are taken into account particularly for the electric drive. In the internal combustion engine a reserve torque is able to be achieved by increasing the air charge at a simultaneously retarded ignition timing. The torque reduction using retarded ignition timing is limited by the combustibility limit of the fuel being combusted in the internal combustion engine. Because of that, a limit comes about for the currently possible reserve torque of the internal combustion engine.

Subsequently, based on this information, a desired distribution of the overall reserve torque to the units may be undertaken, and the units may be activated accordingly. In parallel to this, the overall proportional gain and the overall derivative gain may be divided up to the internal combustion engine and the electric motor(s), namely in a manner corresponding to the distribution of the overall reserve torque. Thus, if, for example, the overall reserve torque is provided 100% by the internal combustion engine, because the electric motor is not able to build up any reserve, then the overall proportional gain and the overall derivative gain are also to be provided exclusively by the internal combustion engine, and vice versa. Interpolation may expediently be performed for the partitioning between the extreme values described.

A stable control may be achieved by the availability of rapid actuating interventions in the sum of all participating units. By utilizing the reserves of the electrical machine, there is the possibility of cutting down on efficiency-reducing ignition angle interventions in the Otto engine.

One particular advantage of the method described is the possible optimization for the avoidance of reserve torques of the internal combustion engine, which are always connected to efficiency deteriorations and utilization deteriorations. For this purpose, the reserve potential of the electric machine is first depleted, and the overall reserve torque, as well as the corresponding overall proportional gain and the overall derivative gain are implemented, as far as possible, using the electrical machine. In this case there would be no need for any reserve torque on the part of the internal combustion engine and consequently no need for an ignition angle intervention. Only if the actuating range of the electrical drive is depleted is the internal combustion engine called upon, so as to ensure the stability of the control system and the regulating quality by the availability of rapid interventions.

The reserve torque of one or more units, that is/are not an internal combustion engine is first depleted, and the corresponding overall gain is realized to the greatest extent using this/these units. When the actuating range of the unit(s) is depleted, the internal combustion engine may be called upon.

BRIEF DESCRIPTION OF THE DRAWING

The FIGURE shows a preferred method sequence.

DETAILED DESCRIPTION

The FIGURE represents a schematic sequence of the method according to the present invention in a preferred hybrid vehicle, that is not shown as an illustration, having an internal combustion engine and an electric motor as units in the vehicle drive. Both units make available torque for a hybrid vehicle drive. This may intermittently take place simultaneously, or one of the respective units may intermittently supply the required torque by itself.

In a first method step 10, a required overall reserve torque and a controller overall gain of a rotational speed controller is determined. The method preferably runs on a control unit according to the present invention. The overall reserve torque may, for instance, be determined based on a driver's command, the switching in of a user, such as an air conditioning system, or even as a function of the current rotational speed.

The overall controller gain includes a proportional component (P component) and possibly a derivative component (D component). If a PID controller is used as the rotational speed controller, the integral component (I component) is preferably implemented at the internal combustion engine.

In a second method step 12, the calculation is made of the boundary values of the possible torque reserves of all available units, in this case, for instance, of the internal combustion engine and the electric motor. Restrictions in the actuating variables of the units are taken into account, in this context.

In a further method step 14, an apportionment of the overall reserve torque is made and a distribution takes place of the overall controller gain to the units. Thereafter, in preferably parallel method steps 16 and 18, the internal combustion engine has applied to it its share of the overall torque reserve, and the electric motor has applied to it its share of the overall torque reserve, with the respective P components and/or D components of the overall gain in the range of 0% to 100%.

First the reserve torque of the electric motor is depleted, in this process, and the corresponding overall gain is implemented to the greatest extent possible, using this unit. When the actuating range of the unit is depleted, the internal combustion engine is called upon.

What is claimed is:

1. A method for operating a hybrid vehicle in which at least two units, of which at least one is an internal combustion engine, supply torque for a hybrid vehicle drive, comprising:
    ascertaining an overall required reserve torque;
    determining boundary values of currently available reserve torques of each individual one of the at least two units;
    in the internal combustion engine, determining a reserve torque that is able to be achieved by increasing an air charge at a simultaneous ignition timing adjustment, the determining of the reserve torque being performed while taking into account a combustibility limit of a fuel;
    in the case of at least one electric motor as another one of the at least two units, drawing upon as one of the boundary values at least one of a maximum torque, a minimum torque, and a state of charge of an energy store, which supplies the electric motor with driving power;
    making an apportionment of the overall reserve torque to individual ones of the at least two units within the determined boundary values, as a function of limits of currently available reserve torques; and
    determining an overall gain of a controller having at least one of an overall proportional component and an overall derivative component apportioned to the at least two units corresponding to the apportionment of the overall reserve torque.

2. A control unit for operating a hybrid vehicle in which at least two units, of which at least one is an internal combustion engine, supply torque for a hybrid vehicle drive, comprising:
    an arrangement for ascertaining an overall required reserve torque;
    an arrangement for determining boundary values of currently available reserve torques of each individual one of the at least two units;
    an arrangement for determining, in the internal combustion engine, a reserve torque that is able to be achieved by increasing an air charge at a simultaneous ignition timing adjustment, the determining of the reserve torque being performed while taking into account a combustibility limit of a fuel;
    in the case of at least one electric motor as another one of the at least two units, an arrangement for drawing upon as one of the boundary values at least one of a maximum torque, a minimum torque, and a state of charge of an energy store, which supplies the electric motor with driving power;
    an arrangement for making an apportionment of the overall reserve torque to individual ones of the at least two units within the determined boundary values, as a function of limits of currently available reserve torques; and
    an arrangement for determining an overall gain of a controller having at least one of an overall proportional component and an overall derivative component apportioned to the at least two units corresponding to the apportionment of the overall reserve torque.

* * * * *